Aug. 26, 1924.

L. S. OSBORN

SAW SET

Filed May 23, 1923

1,505,968

Inventor
Larkin S. Osborn

Witness

By Richard B. Owen,

Attorney

Patented Aug. 26, 1924.

1,505,968

UNITED STATES PATENT OFFICE.

LARKIN S. OSBORN, OF DUNCAN, OREGON.

SAW SET.

Application filed May 23, 1923. Serial No. 640,918.

*To all whom it may concern:*

Be it known that I, LARKIN S. OSBORN, a citizen of the United States, residing at Duncan, in the county of Umatilla and State of Oregon, have invented certain new and useful Improvements in a Saw Set, of which the following is a specification.

This invention relates to a saw set and has for its objects to provide a device for setting the teeth of saws, which device is capable of being used on a large variety of saws such as cross cut saws, drag saws, circular cut saws, etc. The device also aims to provide a simple and efficient structure which is easily operated and which is reliable.

With the above and numerous other objects in view as will appear as the description progresses, the invention resides in certain novel features of construction and in the combination and arrangement of parts as will be hereinafter more fully described and claimed.

In the drawings—

Figure 1:
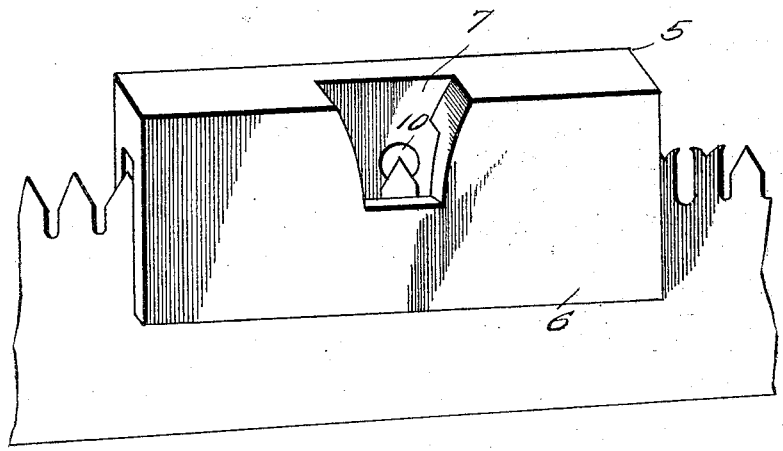
Figure 1 is a perspective view of the device showing the same on a saw.
Figure 2:
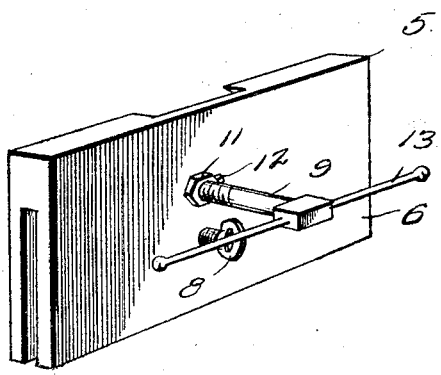
Figure 2 is a perspective view of the device looking at the opposite side from that shown in Figure 1.
Figure 3:
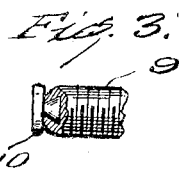
Figure 3 is a detail section through the bolt used for setting the saw teeth.

Referring to the drawing in detail it will be seen that numeral 5 indicates a block which is slotted so as to provide a pair of spaced parallel walls 6. The body of the block is provided with a recess 7 which communicates with the space between the walls 6. The body is set over the saw as is indicated in Figure 1 so that the walls 6 straddle the saw and the tooth to be set projects into the recess 7. A set screw 8 is provided in one of the walls 6 for engagement with the saw thus holding the block in locked engagement with the saw and preventing the tooth from being sprung when it is being set. A bolt 9 is threaded through the block 5 so as to project into the recess 7 and the end which is projected into this recess has swivelly mounted thereon a tooth engaging shoe 10 as is shown to advantage in Figure 3. A nut 11 is threaded on the bolt 9 and a set screw 12 is associated therewith so that this nut may be locked in a desired position on the bolt.

In using the device it is first placed upon the saw as previously explained and the nut 11 is set on the bolt at the desired position depending upon the angle to which the teeth of the saw are to be set. The bolt 9 is provided with a transversely extending handle 13 which may be rotated for screwing the bolt 9 and engaging the shoe 10 with the tooth of the saw. This is continued until the nut 11 reaches the surface of the block and the tooth is then properly set.

Having thus described my invention what I claim as new is:—

1. A device of the class described including a body adapted to be disposed on a saw and setting means associated with the body, said setting means including a bolt threaded through the body, a nut on the bolt, and means for locking the nut on the bolt in a desired position so that the movement of the bolt in respect to the body may be limited.

2. A device of the class described including a block having a slot extending from one longitudinal edge and a recess extending from the other longitudinal edge and communicating with the slot, a bolt threaded through the block so as to project into the recess, a shoe in the recess and swivelled on the end of the bolt, adjustable means on the bolt whereby the movement of the bolt may be limited as desired, and means on the block for securing the same to a saw.

In testimony whereof I affix my signature in presence of two witnesses.

LARKIN S. OSBORN.

Witnesses:
  N. D. PARKS,
  T. H. TERRY.